(12) United States Patent
Wells

(10) Patent No.: US 10,241,707 B2
(45) Date of Patent: Mar. 26, 2019

(54) TECHNIQUES FOR ORGANIZING THREE-DIMENSIONAL ARRAY DATA

(71) Applicant: Intel Corporation, Santa Clara, CA (US)

(72) Inventor: Alex M. Wells, Tigard, OR (US)

(73) Assignee: INTEL CORPORATION, Santa Clara, CA (US)

(*) Notice: Subject to any disclaimer, the term of this patent is extended or adjusted under 35 U.S.C. 154(b) by 134 days.

(21) Appl. No.: 14/129,940

(22) PCT Filed: May 23, 2013

(86) PCT No.: PCT/US2013/042375
§ 371 (c)(1),
(2) Date: Dec. 28, 2013

(87) PCT Pub. No.: WO2014/189511
PCT Pub. Date: Nov. 27, 2014

(65) Prior Publication Data
US 2014/0351529 A1 Nov. 27, 2014

(51) Int. Cl.
*G06F 3/06* (2006.01)
(52) U.S. Cl.
CPC ............ *G06F 3/064* (2013.01); *G06F 3/0604* (2013.01); *G06F 3/0611* (2013.01); *G06F 3/0673* (2013.01)
(58) Field of Classification Search
CPC ...... G06F 12/00; G06F 12/0607; G06F 13/00; G06F 13/1647; G06F 3/064; G06F 3/0604; G06F 3/0673

USPC .......................................... 711/100, 154, 157
See application file for complete search history.

(56) References Cited

U.S. PATENT DOCUMENTS

| 5,736,988 A | 4/1998 | Shaw et al. |
| 6,222,561 B1* | 4/2001 | Egan .................. G06T 1/60 345/501 |
| 2003/0055832 A1 | 3/2003 | Roccaforte |
| 2004/0015310 A1 | 1/2004 | Yuste et al. |
| 2008/0055325 A1* | 3/2008 | Seigneret ............ G09G 5/39 345/538 |

(Continued)

FOREIGN PATENT DOCUMENTS

| KR | 10-2011-0069879 | 6/2011 |
| WO | 2013070925 | 5/2013 |

OTHER PUBLICATIONS

Donofrio et al, WO 2013/070925 May 16, 2013.*

(Continued)

*Primary Examiner* — Tuan V Thai

(57) ABSTRACT

Various embodiments are generally directed to storing data of a three-dimensional (3D) array in a tiled manner in which adjacent rows of adjacent planes are interleaved to enable more efficient retrieval in performing 3D stencil calculations. An apparatus to perform a stencil calculation includes a processor component, a storage communicatively coupled to the processor component, and an interleaving component for execution by the processor component to interleave storage of data of cells of adjacent rows of a first plane with data of cells of adjacent rows of an adjacent second plane of a 3D array among contiguous storage locations of the storage. Other embodiments are described and claimed.

25 Claims, 12 Drawing Sheets

(56) References Cited

U.S. PATENT DOCUMENTS

| | | | |
|---|---|---|---|
| 2010/0231600 A1* | 9/2010 | Kaufman | G09G 5/393 345/545 |
| 2012/0243777 A1 | 9/2012 | Christopher et al. | |
| 2013/0036290 A1 | 2/2013 | Nystad et al. | |
| 2013/0080698 A1 | 3/2013 | Raghunathan | |
| 2013/0097170 A1 | 4/2013 | Flanagan | |

OTHER PUBLICATIONS

Aranda, M et al IBM Techincal Disclosure Bulettin, Apr. 1, 1993.*
International Search Report and Written Opinion received for PCT Patent Application No. PCT/US2013/042375, dated Feb. 28, 2014, 13 pages.
Extended European Search Report received for European Patent Application No. 13885293.4, dated Oct. 20, 2016.

* cited by examiner

TECHNIQUES FOR ORGANIZING THREE-DIMENSIONAL ARRAY DATA

TECHNICAL FIELD

Embodiments described herein generally relate to increasing the efficiency with which data of a three-dimensional array data structure is retrieved.

BACKGROUND

In data processing applications in such areas as image processing, three-dimensional modeling, fluid dynamics, video compression/decompression and arithmetic cellular automata, it is commonplace to work with large amounts of data organized into three-dimensional (3D) arrays. Data organized into such a data structure is then accessible using a triplet of indices that specify a single cell of that array. In working with such data, it is commonplace to perform 3D stencil calculations in which data from each cell and one or more neighboring cells in three dimensions are employed as inputs to a per-cell stencil calculation that is convolved about the cells of the 3D array.

Inefficiencies in accessing the data of the neighboring cells can arise due to the manner in which data of a 3D array is typically stored in a storage. This arises from a common tendency to store data of the cells of a 3D array in a row-column-plane manner in which data of cells that are adjacent to each other in a row are stored in contiguous storage locations in a storage such that they are addressable at adjacent addresses, but data of cells that are adjacent to each other in a column or in other planes are not stored in contiguous storage locations. Where the amount of data in a 3D array is such that the 3D array cannot be stored entirely within a single page of storage locations, the data of an adjacent cell of an adjacent plane may be stored in a storage location within a different page of storage locations. As those familiar with virtual addressing will readily recognize, transitioning from accessing data stored in a storage location of one page to accessing data stored in a storage location of another page can cause the incursion of a considerable time delay compared to accessing data stored at another storage location in the same page.

In virtual addressing, address translations between virtual and physical addresses must be retrieved from a page table as part of retrieving data and/or executable instructions. If the page from which the retrieval is to occur is stored in a relatively fast storage device and if its address translation is cached in a translation look-aside buffer (TLB), then delays incurred in retrieving data and/or instructions from a different page can be greatly minimized. However, where a page has not been accessed sufficiently recently that its associated address translation is not in a TLB (e.g., its address translation has been evicted from the TLB due to the limited number of storage locations of the TLB) and/or the page has been moved to a slower storage device, then delays incurred in retrieving data and/or executable instructions from that page can be considerable. Further, even where pages from which data and/or executable instructions are to be retrieved remain stored on a relatively faster storage device, delays to retrieve address translations from a page table may be repetitively incurred where a routine repetitively accesses many different pages such that address translations for each of those pages are repeatedly evicted from being cached in the TLB.

DETAILED DESCRIPTION

Figure 1:
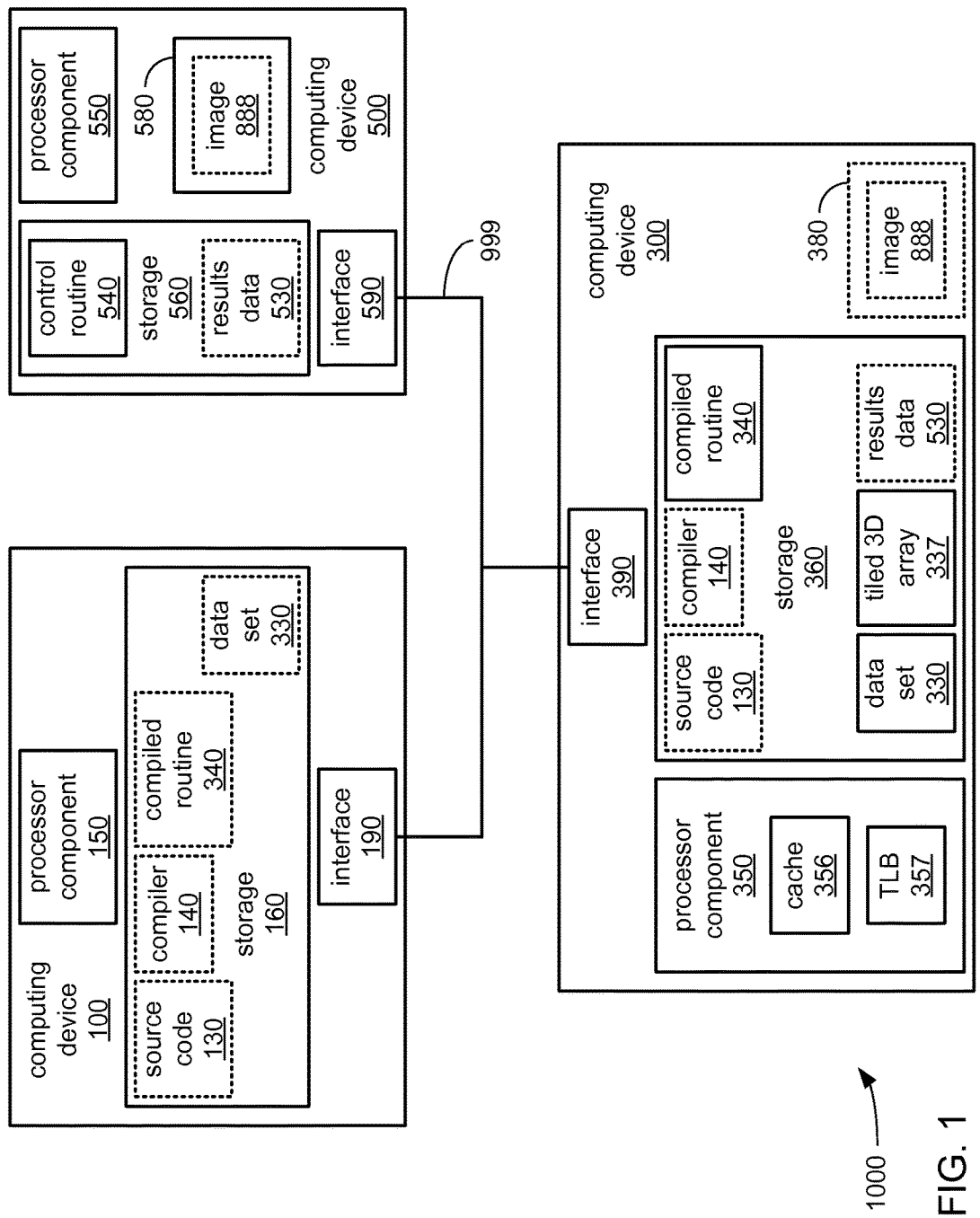
FIG. 1 illustrates an embodiment of a 3D stencil calculation system.

Various embodiments are generally directed to storing data of a three-dimensional (3D) array in a tiled manner in which adjacent rows of adjacent planes are interleaved to enable more efficient retrieval in performing 3D stencil calculations. More specifically, data of the cells of a 3D array having a row-column-plane organization are stored in a storage of a computing device in a manner in which the data of a set of rows that are adjacent to each other in two dimensions, including across two or more adjacent planes, are stored in contiguous storage locations of the storage to form a tile of storage locations that fits within a single page of the storage.

In a first plane of a 3D array, each of its rows extend along a first dimension within that first plane such that multiple rows are positioned side-by-side and adjacent to each across a second dimension within the first plane. Further, each of the rows within the first plane is adjacent across a third dimension to a corresponding row in a second plane and such that the rows of the first and second planes both extend alongside each other in the first dimension. However, while rows of the first and second planes may be positioned adjacent to each other in the 3D array, the data of their cells are typically stored in non-contiguous storage locations such that the data of cells of a row of the first plane are stored in storage locations of one page while the data of cells of an adjacent row of the second plane are stored in storage locations or a different page. As a result, a 3D stencil calculation that includes cells in adjacent rows of different planes is likely to incur a page miss or TLB miss each time it is performed as a result of requiring the retrieval of data stored in storage locations of two different pages. However, with data of cells of rows of both the first and second planes stored in an interleaved manner among contiguous storage locations to form a tile that fits within a single page, data from cells in rows of both the first and second planes may be retrieved to perform a 3D stencil calculation that extends across the first and second planes without repetitive incursions of one or both of such delays.

In some embodiments, a compiled routine includes an accessing component that isolates the organizing of the data of a 3D array into such tiles from other components of a computing device. Such isolation enables other components to continue to interact with the data as if it were organized in storage in a manner meant to follow the row-column-plane organization of the 3D array itself. In other embodiments, the accessing component may accept parameters indicative of aspects of a 3D stencil calculation to enable the accessing component to control the performance of the 3D stencil calculation. In so controlling the performance of a 3D stencil calculation, the accessing component controls the order in which the 3D stencil calculation is performed on the cells of the array as part of performing cache blocking to further increase efficiency by reducing cache misses.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a stencil calculation system 1000 incorporating one or more of computing devices 100, 300 and 500. Each of these computing devices may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

As depicted, these computing devices 100, 300 and 500 exchange signals conveying source code and/or executable code that includes instructions to interleave rows of cells of data of a 3D array and/or the data of a 3D array through a network 999. However, one or more of these computing devices may exchange other data entirely unrelated to such handling of data with each other and/or with still other computing devices (not shown) via the network 999. In various embodiments, the network may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the computing device 300 incorporates one or more of a processor component 350, a storage 360, a display 380 and an interface 390 to couple the computing device 300 to the network 999. The storage 360 stores one or more of a source code 130, a compiler 140, a compiled routine 340, a data set 330, a tiled 3D array 337 and a results data 530. The processor component 350 incorporates one or both of a cache 356 and a translation look-aside buffer (TLB) 357.

As will be familiar to those skilled in the art of prefetching algorithms and processor caches, the cache 356 employs one or more prefetching algorithms to mitigate delays incurred in retrieving data from the storage 360 by attempting to predict what data will next be required by the processor component 350, preemptively retrieving it and storing it in the cache lines of the cache 356. Where such preemptive retrieval is successful, the processor component 350 is able to retrieve the data it requires next from one of the cache lines of the cache 356, and this is commonly referred to as a "cache hit." The cache 356 responds far faster than the storage 360 such that the delay in retrieving that data from the perspective of the processor component 350 is minimized when there is a cache hit. Where such preemptive retrieval is not successful, the data required next by the processor component 350 is not in any cache line of the cache 356 when the processor component 350 requires it, and this is commonly referred to as a "cache miss."

As will be familiar to those skilled in the art of virtual addressing and TLBs, the TLB 357 maintains a cache of a page table (not shown) that may be stored in the storage 360 to support virtual addressing. Virtual addressing presents some of the routines executed by the processor component 350 (e.g., the compiled routine 340) with a virtual address space that spans storage locations within both faster and slower storage devices that make up the storage 360. This virtual address space is divided into portions referred to as "pages" and the page table stores address translations between virtual addresses of each page and physical addresses indicative of where each page is actually stored in the one or more storage devices that make up the storage 360. During normal operation, one or more algorithms are used to determine which pages contain data and/or executable instructions that are more or less likely to be required by the processor component 350 in at least the near future. Pages containing data and/or executable instructions that are deemed less likely to be so required are moved from faster storage devices of the storage 360 (e.g., random-access memory) to slower storage devices of the storage 360 (e.g., a ferro-magnetic disk drive) to enable pages containing data and/or executable instructions that are deemed more likely to be required by the processor component 350 to be moved from slower storage devices of the storage 360 to faster ones.

The TLB 357 is typically implemented as content-addressable memory with a relatively limited number of entries. Where the processor component 350 retrieves data and/or executable instructions from a page for which an address translation entry does exist in the TLB 357, the delay of having to retrieve that address translation from the page table stored in the storage 360 is avoided, and this is commonly referred to as a "TLB hit." A "TLB miss" is said to occur in such a retrieval where its associated address translation is not in the TLB 357. If the page from which the data and/or executable instructions are to be retrieved is stored in a faster storage device of the storage 360, then the additional delay of making that retrieval from a slower storage device is avoided, and this is commonly referred to as a "page hit." A "page miss" is said to occur in such a retrieval where the page is stored in a slower storage device of the storage 360 such that the retrieval entails accessing that slower storage device. In a worst case scenario, a retrieval of data and/or executable instructions can result in both a TLB miss and a page miss such that the delays of accessing the page table to retrieve an address translation and of accessing a slower storage device to retrieve the actual data and/or executable instructions are both incurred.

As will be explained in greater detail, the compiled routine 340 incorporates an accessing component that creates the tiled 3D array 337 from the data of the data set 330, and incorporates a stencil component to perform a 3D stencil calculation on the data as stored in the tiled 3D array 337. The results of the 3D stencil calculation may be stored as the results data 530, or the results may be stored within the tiled 3D array 337 as updates to the data stored therein. Also, the compiled routine 340 may be compiled by the compiler 140 from the source code 130, or such compilation may be performed by the computing device 100.

Figure 2:
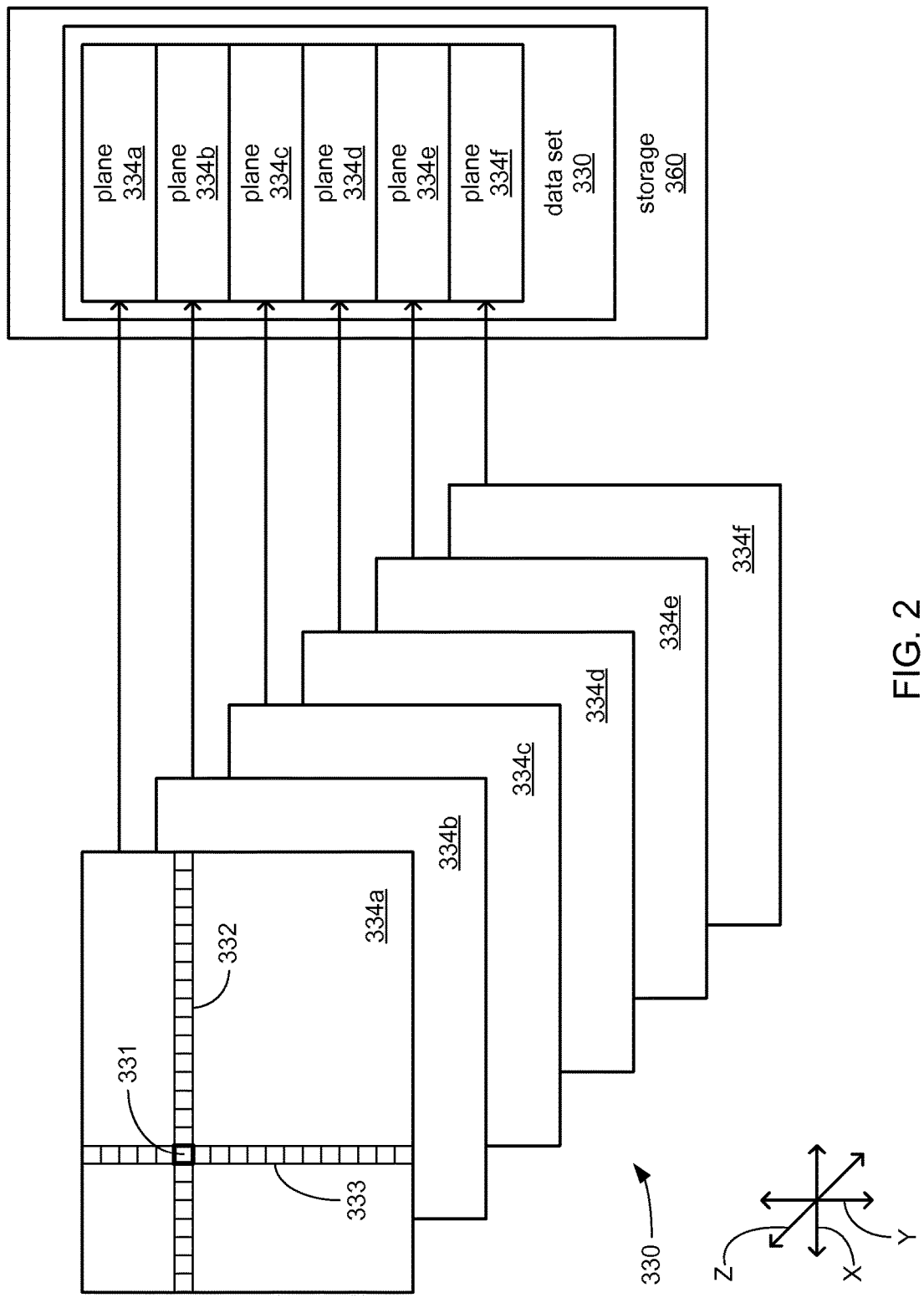
FIGS. 2-3 each illustrate aspects of typical organization of 3D data in an embodiment.

Turning to FIG. 2, as depicted, the data set 330 may be data already organized into a 3D array in which pieces of data are associated with cells 331 organized into multiple two-dimensional (2D) arrays of rows 332 (extending parallel to a X-axis) and columns 333 (extending parallel to a Y-axis). Each such 2D array becomes one of multiple equal-sized planes 334a-f that extend in parallel with each other (stacked along a Z-axis) to give this 3D array a 3D rectilinear configuration in which each of the cells 331 is individually addressable via a triplet of indices specifying a cell's position along the X, Y and Z axes. It should be noted that this depiction of the data set 330 in three dimensions is not intended to be to scale for any particular data or type of 3D data, and that the specific depiction of a quantity of six planes 334a through 334f is but an example, and should not be taken as limiting.

FIG. 2 also depicts the manner in which this 3D array form of the data set 330 might typically stored in a storage 360. The data associated with each of the planes is stored in sets of contiguous storage locations, those sets being arranged in the storage 360 in the same order in which their corresponding planes are stacked along the Z-axis from plane 334a through plane 334f. In other words, all of the data associated with the plane 334a is stored in a first set of contiguous storage locations, followed by all of the data associated with the plane 334b being stored in a second set of contiguous storage locations, and so on.

Also, within each set of contiguous storage locations associated with one of the planes 334a-f, the data associated with a first one of the rows 332 (e.g., the top row or the bottom row) of that plane is stored in a first subset of the set of contiguous storage locations of that plane, followed by the data associated with the next one of the rows 332 being stored in a second subset of contiguous storage locations, and so on. In other words, subsets of contiguous storage locations associated with each of the rows 332 that make up the set of contiguous storage locations for one of the planes 334a-f are arranged in an order that corresponds with order of the rows 332 of that plane.

Further, within each subset of contiguous storage locations associated with one of the rows 332, the order in which the data of each of the cells 331 of that row is stored among the storage locations of that subset is chosen to correspond to the order of the cells of that row from one end to the other. As a result, the data associated with any two of the cells 331 that are adjacent to each other within one of the rows 332 are stored in the storage 360 at adjacent storage locations within the subset of storage locations associated with that row.

Such a manner of ordering the data of the data set 330 into a 3D array is usually highly efficient for being sequentially accessed to either store or retrieve the data, especially for transfers of the data set 330 as a serial bitstream via a network (e.g., the network 999). A widely used approach to such storage or retrieval is to employ a triplet of indices in a three-layered nested set of loops. The index for the X-axis is recurringly incremented/decremented in the inner-most loop to iterate through each cell 331 of each row 332, the index for the Y-axis is recurringly incremented/decremented in a middle loop to iterate through each row 332 of each of the planes 334a-f, and the index for the Z-axis is incremented/decremented in the outer-most loop only once to iterate through each one of the planes 334a-f.

Figure 3:
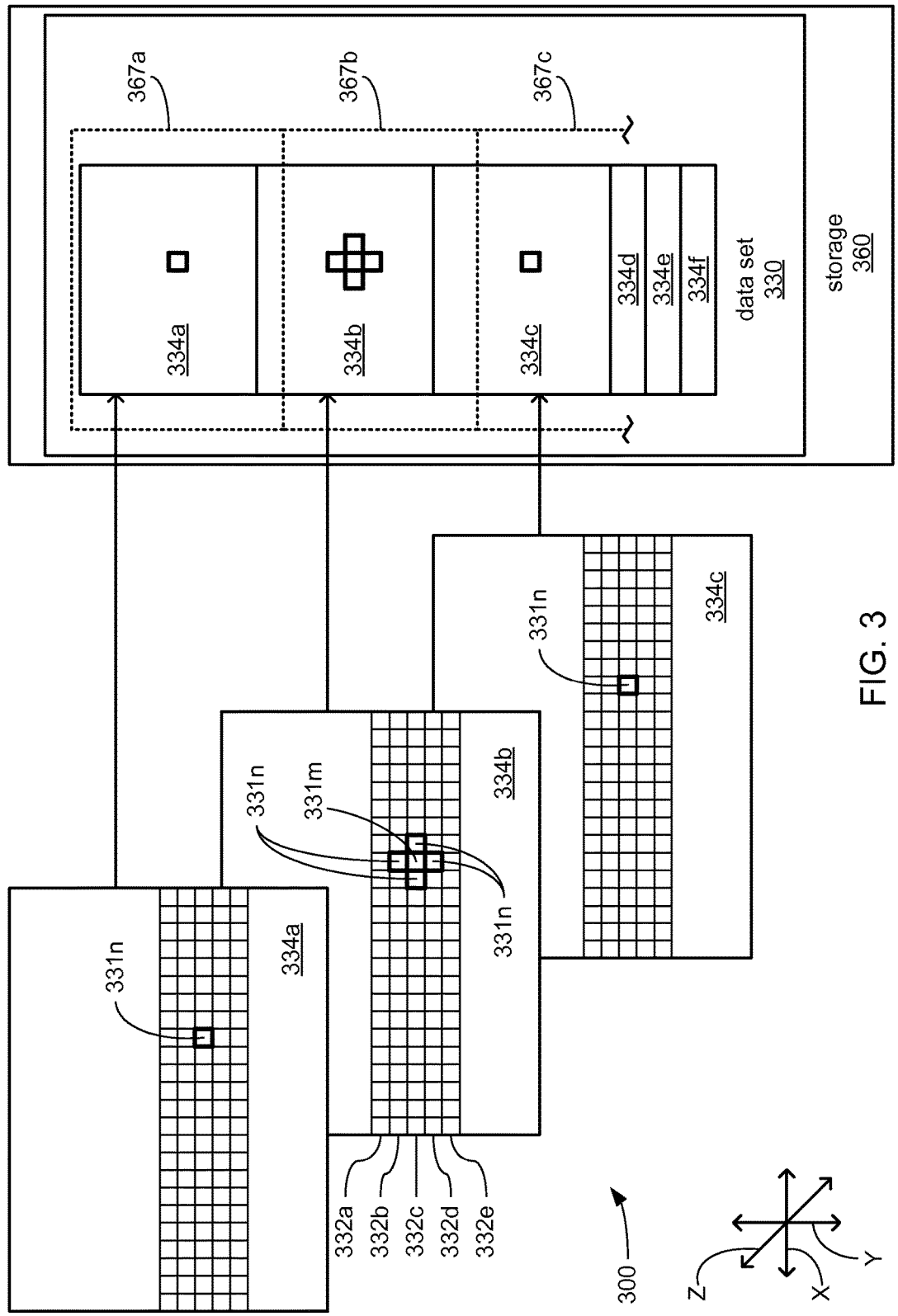

Unfortunately, while such an organization of data may be efficient for sequential access for storage and retrieval, it may prove rather inefficient for being accessed in performing 3D stencil calculations as depicted in FIG. 3. A performance of an example 3D stencil calculation is depicted that requires data of a cell 331m in row 332c of plane 334b, as well as data of adjacent cells 331n from the same row 332c, from adjacent rows 332b and 332d of the same plane 334b, and from the same row 332 of adjacent planes 334a and 334c. Stated differently, this example stencil calculation requires data of the cell 331m and from each of its six immediately adjacent cells 331n in either direction along each of the X, Y and Z axes. The shape of a stencil for a stencil calculation (whether a 3D stencil calculation, or not) is defined by the selection of adjacent cells from which data is required in addition to the one cell at the focus of the stencil calculation. Thus, the shape of the 3D stencil representative of the cells 331m and 331n from which data is to be retrieved for the depicted example 3D stencil calculation is describable as a "3D cross."

Given the manner in which the data of the data set 330 is stored in the storage 360, as described at length above, the data associated with the two adjacent cells 331n within the same row 332c of the same plane 334b as the cell 331m (e.g., the two adjacent cells 331n that are adjacent to the cell 331m along the X-axis) are stored in storage locations that are contiguous with the storage location of the data of the cell 331m. Thus, it is entirely likely that the data for these two of the adjacent cells 331n have already been retrieved along with the data of the cell 331m as part of filling a cache line of the cache 356 of the processor component 350. Further, the data associated with the two adjacent cells 331n in the adjacent rows 332b and 332d of the same plane 334b as the cell 331m (e.g., the two adjacent cells 331n that are adjacent to the cell 331m along the Y-axis) are stored in storage locations within subsets of storage locations for those two rows that are contiguous with the subset of storage locations for the row 332c of the same plane 334b. Thus, although retrieving the data for these two of the adjacent cells 331*n* is more likely to incur a cache miss, their retrieval is unlikely to incur either a TLB miss or a page miss, since it may well be that the retrieval is from the same page.

However, the data associated with the two adjacent cells 331*n* in corresponding ones of the row 332*c* in each of the adjacent planes 334*a* and 334*c* are stored in storage locations that are in no way contiguous with the storage location of the data of the cell 331*m* or the subset of storage locations of the row 332*c* of the plane 334*b* in which the cell 331*m* is located. Depending on the amount of data stored in each of the planes, retrieving the data of these two adjacent cells 331*n* in the adjacent planes 334*a* and 334*c* will likely result in a considerable jump in storage location addresses from the storage location of the data of the cell 331*m* such that their data may need to be retrieved from other pages of the storage 360.

FIG. 3 further depicts the manner in which the boundaries of the sets of storage locations associated with each of the planes 334*a-c* align with the boundaries of pages 367*a*, 367*b* and 367*c*. As can be seen, the entire set of storage locations associated with the plane 334*a* fits within the page 367*a*, while most of the set of storage locations associated with the plane 334*b* fits within the page 367*b* and most of the set of storage locations associated with the plane 334*c* fits within the page 367*c*. As a result, and as depicted, retrieving the data of the adjacent cells 331*n* in each of the planes 334*a* and 334*c* does entail retrieving data from different pages (e.g., the storage pages 367*a* and 367*c*) from the page 367*b* in which the data of the cell 331*m* is stored. As has been discussed, this can result in instances of incurring delays associated with TLB misses and/or a page misses.

As those familiar with the use of 3D stencil calculations will readily recognize, such calculations are only seldom ever performed only once. Usually, 3D stencil calculations are performed a great many times as they are convolved about a portion of a 3D array made up of numerous cells, or are convolved about an entire 3D array. Thus, the delays arising from TLB misses and/or page misses in accesses to other pages could be frequently incurred each time the example 3D stencil calculation of FIG. 3 is performed as it is convolved about at least a portion of the data set 330 that is made up of many of the cells 331. Such possible frequent recurrence of such delays can greatly reduce the rate at which the example 3D stencil calculation is able to be performed.

It should be noted that the example 3D stencil calculation depicted in FIG. 3 is a rather simplified example provided herein for purposes of illustration. As those skilled in the art of will readily recognize, 3D stencil calculations typically employ a much larger stencil that encompasses data from multiple adjacent cells within a row, multiple adjacent cells across multiple adjacent rows and/or multiple adjacent cells across multiple adjacent planes. Indeed, it is not unheard of for a 3D stencil for a 3D stencil calculation to be as much as 33 cells wide in one or more dimensions. Where such a width extends across multiple planes, there is a high likelihood that the 3D stencil is defined such that it necessarily extends across multiple pages of a storage.

In such situations, the number of pages accessed for each performance of a 3D stencil calculation may require data to be retrieved from so many different pages that each access to each page results in a TLB miss as such a great number of pages results in the address translation for each page being evicted from the TLB before it can be used again in the very next performance of that 3D stencil calculation in a situation commonly referred to as "thrashing." Quite simply, depending on the number of storage locations in a TLB versus the number of pages being accessed, there may simply be so many pages accessed by some 3D stencil calculations that it overwhelms the number of storage positions available in a typical TLB. This situation can be further exacerbated by the fact that a 3D stencil calculation is seldom the only process underway in a typical computer system, as there are typically at least one or more system processes that also engage in accesses data and/or executable instructions in various pages, and therefore, are also making use of whatever limited number of storage locations may exist in a typical TLB. As those skilled in the art will readily recognize, this situation is very much akin to thrashing among the limited cache lines of a relatively small cache inasmuch as any possibility of mitigating the effects of delays in accessing storage locations that might have been provided by a cache, or by a TLB, are entirely lost.

Returning to FIG. 1, such repetitive incursion of delays arising from TLB and/or page misses may be minimized by the formation of the tiled 3D array 337 with the data of the data set 330 copied into it and organized in a manner more amenable to performing a 3D stencil calculation. As will be explained in greater detail, access to that data, once stored in the tiled 3D array 337, may be controlled in a manner that enables it to be accessed in the serial manner previously described for retrieval and storage of the entirety of that data, but that also enables it to be accessed in a manner that is more efficient for the performance of a stencil calculation convolved about part or all of that data.

Figure 4:
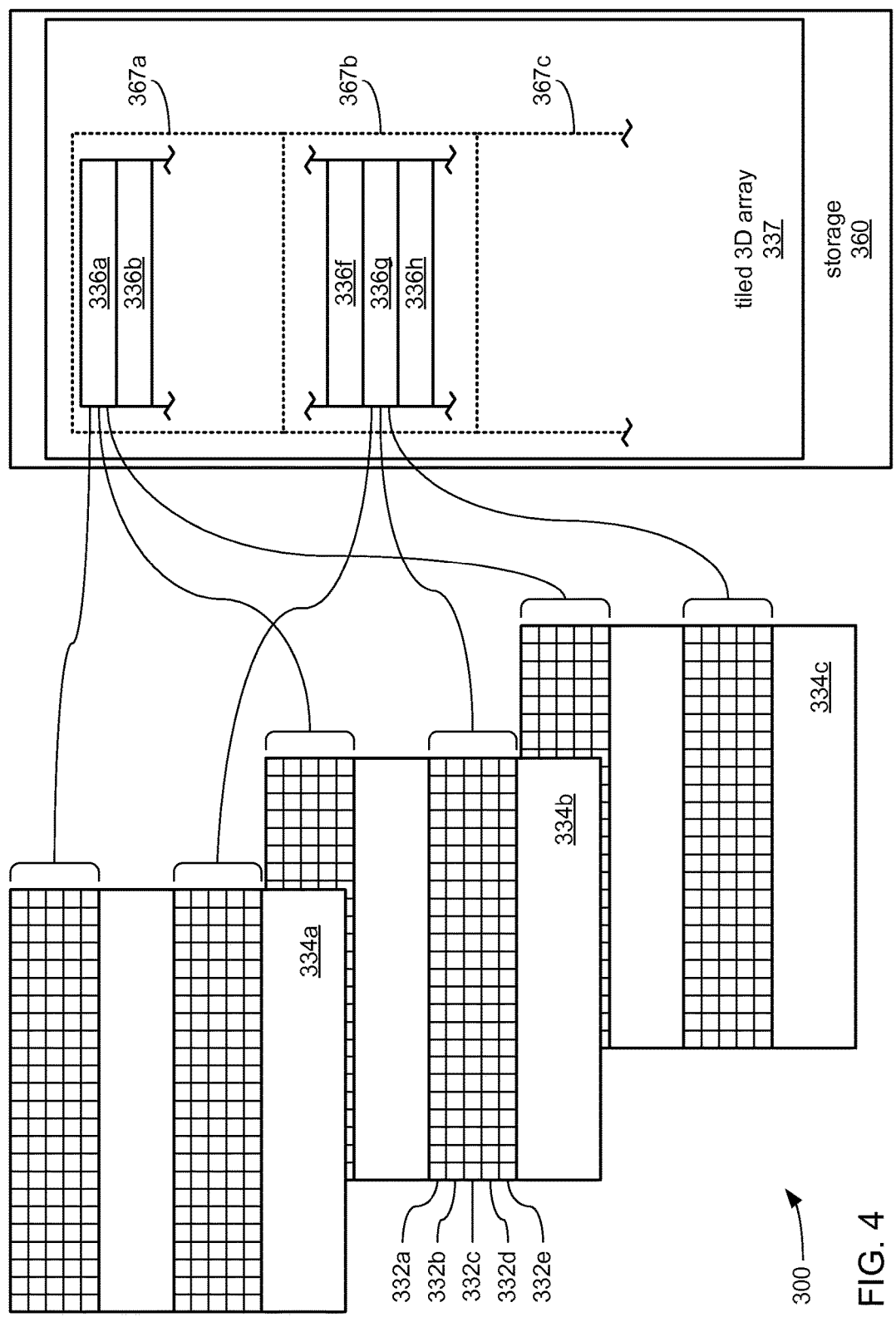
FIGS. 4-5 each illustrate aspects of improved organization of 3D data in an embodiment.

Turning to FIG. 4, as depicted, the data of the data set 330 has been copied into the tiled array 337, and in the process, multiple rows from each of different planes have been interleaved, forming a series of tiles in the storage 360 that represent 3D sets of rows. It should be noted that for the sake of visual clarity, the formation of only two tiles 336*a* and 336*g* are specifically depicted, despite there being still more of such tiles formed. Therefore, as specifically depicted, the tile 336*a* is formed from the top-most five rows of each of the planes 334*a*, 334*b* and 334*c*. Also, the tile 336*g* is formed from the rows 332*a-e* of each of the planes 334*a*, 334*b* and 334*c*, these being the same rows depicted in FIG. 3 and discussed, above.

Figure 5:
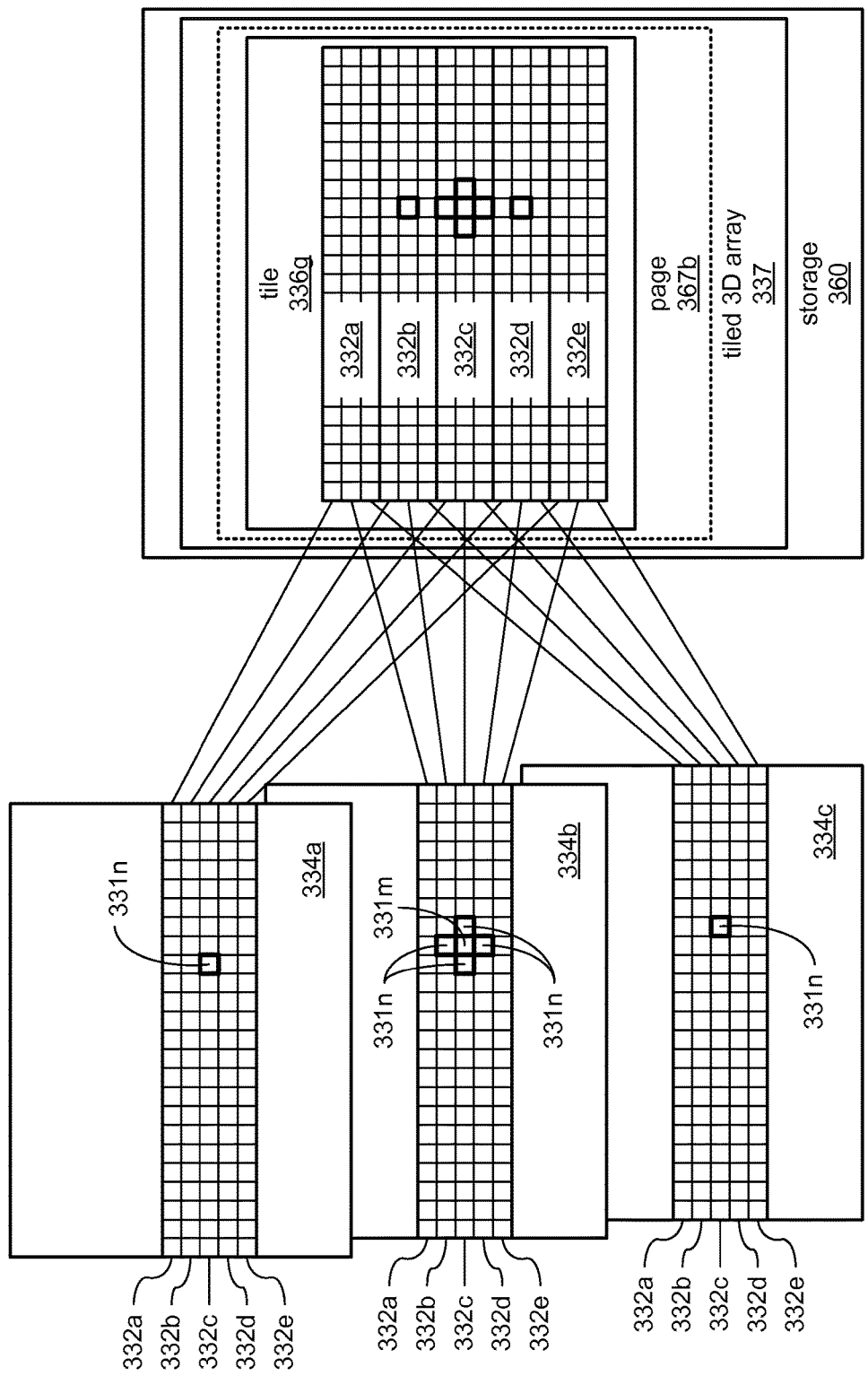

Turning to FIG. 5, the manner in which the data of each of the rows 332*a-e* of each of the planes 334*a-c* is organized within the tile 336*g* is more clearly depicted. Specifically, the organization of the data starts with the data of the row 332*a* of the plane 334*a*, followed by the data of the same row of the plane 334*b*, and followed by the data of the same row of the plane 334*c*. This is then followed by the data of the row 332*b* of the plane 334*a*, followed by the data of the same row of the plane 334*b*, and followed by the data of the same row of the plane 334*c*. This same interleaving pattern of the data of corresponding rows of the different planes 334*a-c* continues with corresponding ones of the rows 332*c*, then corresponding ones of the rows 332*d*, and then corresponding ones of the rows 332*e*. The result is an alternating order of multiple adjacent rows from multiple adjacent planes in an interleaving pattern that causes the data of cells that are adjacent in three dimensions in a portion of a 3D array to be stored in contiguous storage locations that are close enough to be within a single page.

With this interleaving of rows of different planes, the data of adjacent rows of different planes are no longer so greatly separated within each tile. It should be noted that such a use of interleaving to form such tiles does not entirely eliminate instances in which a 3D stencil calculation requires data of cells in different pages such that delays arising from TLB and/or page misses are always avoided. However, such interleaving of adjacent rows of different planes among adjacent rows within each of those planes does reduce the frequency of instances in which a 3D stencil calculation will require data from more than one page. However, through the use of such interleaving, it may be possible to reduce the number of pages that must be accessed in each performance of a 3D stencil calculation (even with a relatively large 3D stencil) sufficiently that thrashing within the TLB 357 may be avoided as a 3D stencil calculation is repeatedly performed. Turning to the particular example of a 3D stencil operation first presented in FIG. 3, as can be seen, this example of interleaving of rows depicted in FIG. 5 has resulted in all of the rows having cells that have data required by the example 3D stencil calculation now being within the same single plane.

It should be noted that FIGS. 4 and 5 present just one possible example of such interleaving of rows in which five adjacent rows of each of three adjacent planes were interleaved. Other embodiments are possible in which differing numbers of adjacent rows in differing numbers of adjacent planes may be so interleaved. It should also be noted that different patterns of interleaving may be performed, such as interleaving pairs, triplets, quartets, etc. of adjacent rows of one plane with pairs, triplets, quartets, etc. of adjacent rows of one or more adjacent planes. It should also be noted that despite the depiction of each tile as being made up of complete rows, it is possible in other embodiments that particularly lengthy rows may be subdivided into portions that are included in different tiles. This may be deemed desirable where the rows are so very long that the inclusion of a relatively small number of the rows is enough to fill an entire page with data such that not enough adjacent rows are able to be included in a single tile to provide a significant advantage for 3D stencil calculations.

Such subdividing of rows may also be done to create portions of rows that are able to fit within the byte width of one or more registers of the processor component 350. This may be deemed desirable where the processor component 350 employs a single-instruction multiple-data (SIMD) architecture such that it has relative wide registers able to hold and/or perform operations on data of multiple cells of a row. Thus, the manner in which the data of the data set 330 is stored in storage locations associated with the tiled 3D array 337 may be selected to align the data of individual cells with the manner in which one or more SIMD registers of the processor component 350 are divided into lanes. Alternatively or additionally, such subdividing may be done to create portions of rows that fit within a single cache line of the cache 356 or fit within a selected quantity of cache lines or the entirety of the cache 356.

It should be noted that despite the depiction of multiple tiles being contained within a page of the storage 360, embodiments are possible in which a quantity of adjacent rows within each plane and a quantity of adjacent planes may be chosen to define a single tile that substantially fills a page of the storage 360. Indeed, in some embodiments, it may be deemed desirable to distribute the tiles within the storage 360 in a manner that aligns with the distribution of pages of the storage 360 such that no tile is split between two pages. Alternatively, the quantity of adjacent rows within each plane and the quantity of adjacent planes may be chosen to define a single tile that actually spans multiple pages. These different possible configurations of tiling may be selected in different embodiments as needed to provide a substantial reduction in the number of pages that a 3D stencil calculation must access during each occasion of being performed to at least avoid thrashing in the TLB 357.

Returning to FIG. 1, the compiled routine 340 incorporates a sequence of instructions operative on the processor component 350 in its role as a main processor component of the computing device 300 to implement logic to perform various functions. In executing the compiled routine 340, the processor component 350 receives the data set 330 from another computing device (e.g., the computing device 100) and/or retrieves it from the storage 360, and then creates the tiled 3D array 337 therefrom. In so doing, the data of the data set 330 is caused to be stored in the tiled 3D array 337 in a manner more amenable to the performance of a 3D stencil calculation by reducing instances of TLB misses in the TLB 357 (in an effort to avoid thrashing therein) and/or page misses.

In executing the compiled routine 340, and depending on the nature of the data making up the data set 330, the processor component 350 may further visually display an image 888 derived from the 3D stencil calculation performed on the data set 330 as stored in the tiled 3D array 337 on the display 380 (if present). Specifically, in embodiments in which the results of such a 3D stencil calculation are stored as the results data 530, the processor component 350 may visually present the image 888 derived from the results data 530. Alternatively, where the results of a 3D stencil calculation are used to update data stored within the tiled 3D array 337, the processor component 350 may visually present the image 888 derived from the data of the tiled 3D array 337.

The compiler 140 (if present within the storage 360) may incorporate a sequence of instructions operative on the processor component 350 in its role as a main processor component of the computing device 300 to implement logic to perform various functions. In executing the compiler 140, the processor component 350 compiles the source code 130 to generate the compiled routine 340 to be executed by the processor component 350 as just described. In so doing, the processor component 350 may parse the source code 130 for a data structure definition of the tiled 3D array 337 and/or a definition of a 3D stencil operation to be performed on the data set 330 as stored as the tiled 3D array 337.

In various embodiments, the computing device 100 incorporates one or more of a processor component 150, a storage 160 and an interface 190 to couple the computing device 100 to the network 999. The storage 160 stores one or more of the source code 130, the compiler 140, and the compiled routine 340. In embodiments in which the computing device 100 is present, the compiling of the source code 130 to generate the compiled code 340 may be performed by the processor component 150 of the computing device 100, instead of by the processor component 350 of the computing device 300.

Thus, the compiler 140, as stored within the storage 160, may incorporate a sequence of instructions operative on the processor component 150 to implement logic to perform various functions. In executing the compiler 140, the processor component 150 may compile the source code 130 to generate the compiled graphics routine 340. Upon completion of such compiling, the processor component 150 may operate the interface 190 to transmit the compiled routine 340 to the computing device 300 for execution, possibly along with the data set 330.

In various embodiments, the computing device 500 incorporates one or more of a processor component 550, a storage 560 and an interface 590 to couple the computing device 500 to the network 999. The storage 560 stores one or more of the results data 530 and a control routine 540. In embodiments in which the computing device 500 is present, the visual presentation of the image 888 may be performed by the processor component 550 of the computing device 500, instead of by the processor component 350 of the computing device 300.

Thus, the control routine 540 may incorporate a sequence of instructions operative on the processor component 550 to implement logic to perform various functions. In executing the control routine 540, the processor component 550 may visually present the image 888 based in some manner on the results data 530. The processor component 550 may operate the interface 590 to receive signals transmitting the results data 530 from the computing device 300.

In various embodiments, each of the processor components 150, 350 and 550 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, each of the storages 160, 360 and 560 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interfaces 190, 390 and 590 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 6:
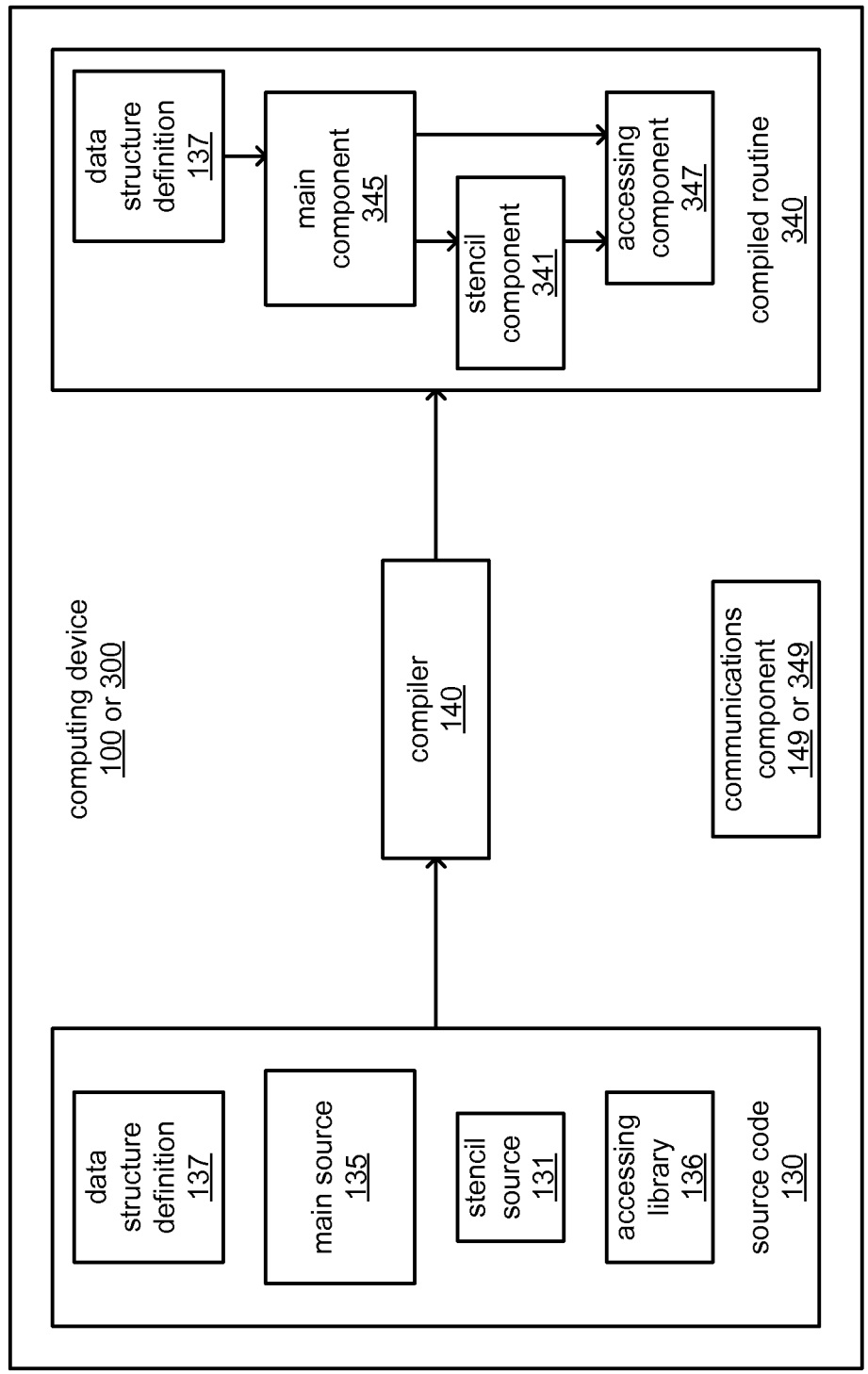
FIGS. 6-8 each illustrate aspects of improved support for 3D stencil calculations.
Figure 7:
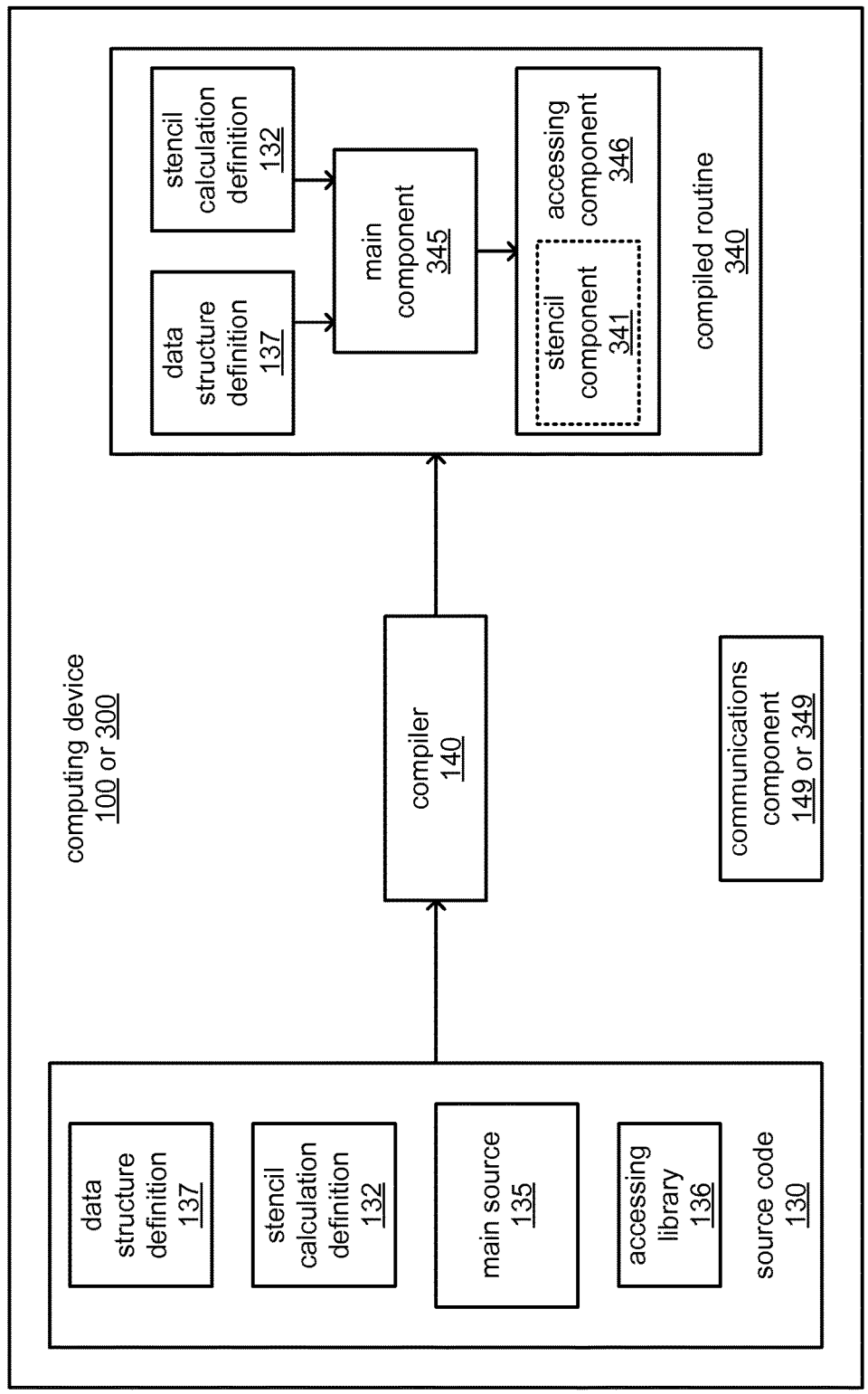
Figure 8:
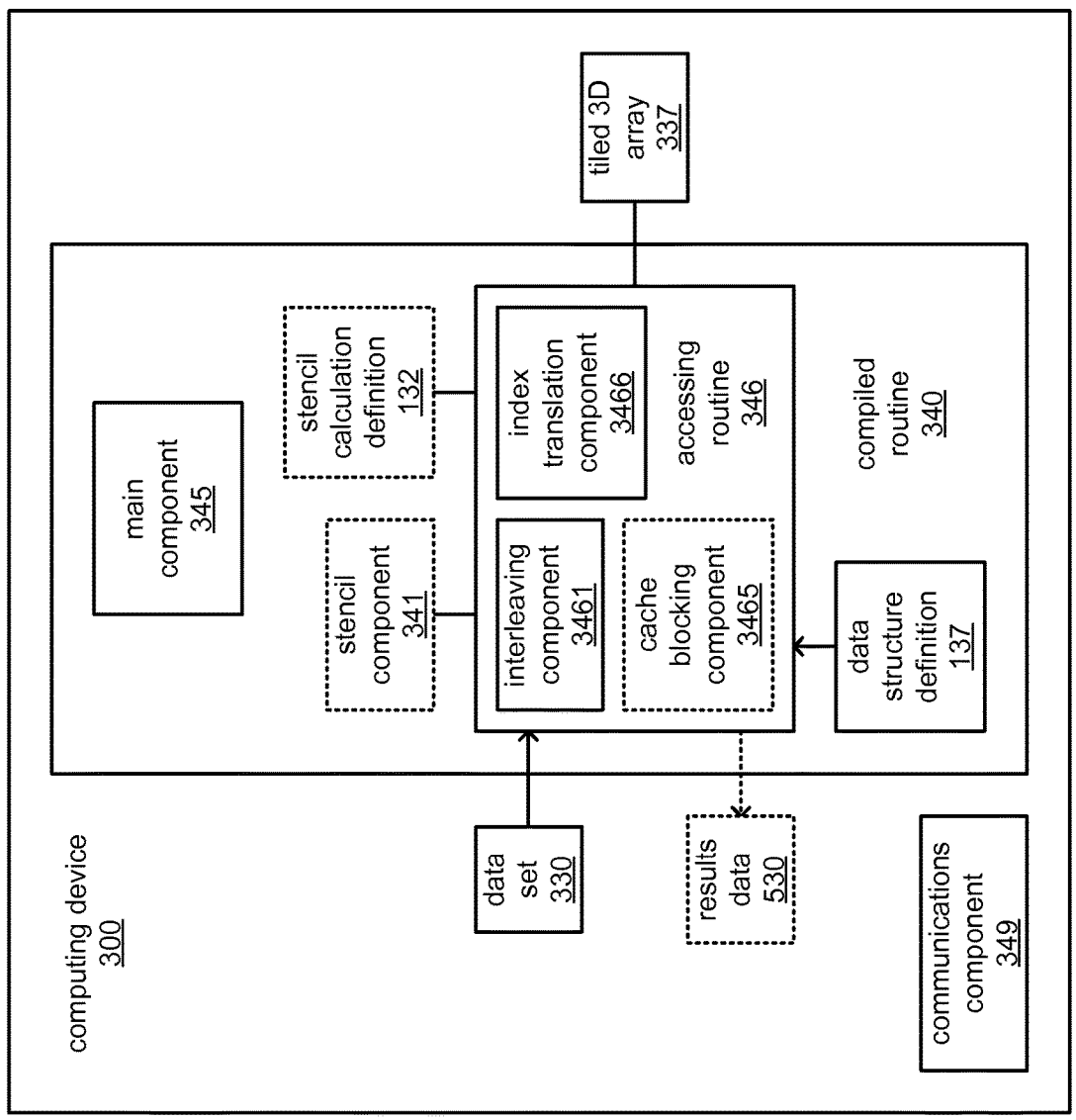

FIGS. 6, 7 and 8 each illustrate a block diagram of a portion of a possible embodiment of the stencil calculation system 1000 of FIG. 1 in greater detail. More specifically, FIGS. 6 and 7 depicts aspects of the operating environment of either the computing device 100 or 300 in which either the processor component 150 or 350, in executing the compiler 140, performs the aforedescribed functions in compiling the source code 130 in different embodiments. FIG. 8 depicts aspects of the operating environment of the controller 300 in which the processor component 350, in executing the compiled routine 340, performs the aforedescribed functions in organizing data in to a tiled 3D array and performing a 3D stencil calculation on at least a portion of that tiled 3D array. As will be recognized by those skilled in the art, the compiler 140 and the compiled routine 340, including the components of which each is composed, are selected to be operative on whatever type of processor or processors that are selected to implement applicable ones of the processor components 150 or 350.

In various embodiments, each of the compiler 140 and the compiled routine 340 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 150 or 350. Where one or more device drivers are included, those device drivers may provide support for any of a variety of other components, whether hardware or software components, of corresponding ones of the computer systems 100 or 300.

The compiler 140 or compiled routine 340 may include or be otherwise linked to one or both of communications components 149 or 349, executable by whatever ones of the processor components 150 or 350 to operate the interface 190 or 390 to transmit and receive signals via the network 999 as has been described. Among the signals received may be signals conveying the source code 130, the compiled routine 340, the data set 330 and/or the results data 530 among one or more of the computing devices 100, 300 or 500 via the network 999. As will be recognized by those skilled in the art, each of these communications components is selected to be operable with whatever type of interface technology is selected to implement corresponding ones of the interfaces 190 and 390.

In both FIGS. 6 and 7, the compiler 140 parses the source code 130 and generates the compiled routine 340 therefrom. The source code 130 includes a data structure definition 137 specifying parameters of a tiled 3D array (e.g., the tiled 3D array 337). Among those parameters may be indications of the configuration of a tile, including how many adjacent planes and how many adjacent rows within each of those adjacent planes to include data from in each tile. Alternatively or additionally, those parameters may include indications of aspects of the pattern for interleaving data from multiple adjacent rows of each of multiple adjacent planes, such as whether to interleave data from single rows from each adjacent plane, pairs of such rows, triplets of such rows, quartets of such rows, etc.

The source code 130 also includes an accessing library 136 made up of instructions to be executed to at least create a tiled 3D array and access data of the cells thereof. The accessing library 136 may also include instructions to be executed to perform cache blocking and/or to perform a 3D stencil calculation based on receipt of parameters describing various aspects of it. The source code 130 also includes a main source 135 made up of instructions to perform various other aspects of whatever overall function is meant to be performed by the compiled routine 340 upon being compiled.

Still further, the source code 130 in both FIGS. 6 and 7 includes some form of indication of a 3D stencil calculation to be performed. In FIG. 6, this indication is in the form of stencil source 131 made up of instructions to be executed to perform the 3D stencil calculation. However, in FIG. 7, this indication is in the form of a stencil calculation definition 132 made up of parameters that describe the calculation (e.g., the shape, size and/or other parameters of the 3D stencil representing what neighboring cells provide data as input, etc.).

Turning more specifically to FIG. 6, upon compilation of the source code 130, the compiled routine 340 is generated to include a main component 345, an accessing component 346 and a stencil component 341 derived from the main source 135, the accessing library 136 and the stencil source 131, respectively. The main component 345 is configured to signal the accessing component 346 to create a tiled 3D array in accordance to the data definition structure 137, and to signal the stencil component 341 to perform a 3D stencil calculation on the data stored within that tiled 3D array.

Turning more specifically to FIG. 7, upon compilation of the source code 130, the compiled routine 340 is generated to include a main component 345 and an accessing component 346 derived from the main source 135 and the accessing library 136, respectively. The main component 345 is configured to signal the accessing component 346 to create a tiled 3D array in accordance to the data definition structure 137. However, unlike the compiled routine 340, in which there is a distinct stencil component 341 signaled by the main component 345 to perform a 3D stencil operation, the main component 345 is configured to signal the accessing component 346 to itself perform a 3D stencil calculation defined by the stencil calculation definition 132 on data stored within the tiled 3D array. In effect, the accessing component 346 is signaled to function in place of a distinct stencil component 341.

Turning more specifically to FIG. 8, more detail of the accessing component 346 is depicted as the accessing component 346 creates the tiled 3D array 337, and then fills the tiled 3D array 337 with the data from the data set 330. Specifically, the accessing component 346 incorporates an interleaving component 3461 to create the tiled 3D array 337 in which data from multiple adjacent rows within each of two or more adjacent planes in the data set 330 are interleaved in the order in which they are stored in the storage locations of the storage 360 such that contiguous storage locations are used to store data of cells of adjacent rows from adjacent planes.

In some embodiments, in creating the tiled 3D array 337, the accessing component 346 may create the tiled 3D array 337 to have more rows, columns and/or planes than are actually necessary to store the data of the data set 330. As will be familiar to those skilled in the art, a 3D array may be made larger than necessary for the data that it is to contain to provide what some have called "padding" to accommodate the performance of a stencil calculation centered on cells that are at or near one or more of the outer boundaries or "edges" of an array. Given that stencil calculations entail retrieving data from cells adjacent to the cell on which its performance is centered at any given time, the performance of a stencil calculation centered on a cell at a boundary or edge of any array can result in that stencil calculation attempting to retrieve data from cells beyond that boundary or edge that, of course, don't exist. In so doing, that stencil calculation could actually reach into one or more pages in which is stored data and/or executable instructions that are in no way related to the data of that array, thereby inviting the possibility of unpredictable results in those stencil calculations.

One solution to this is to include various location tests in the instructions to perform the stencil calculation so that it checks the location of the cell on which its current performance is centered to determine whether it is close enough to a boundary or edge of any array that one or more of the adjacent cells may not exist. However, the incorporation of such tests necessarily results in those tests having to be performed each time the stencil calculation is performed. Since stencil calculations are typically performed numerous times such that they are convolved about numerous cells of an array (if not all the cells of an array), the inclusion of such tests in each performance of that stencil calculation would greatly degrade the rate at which the stencil calculation could be convolved about the array.

The addition of "padding" to an array provides extra "dummy" cells beyond one or more of the boundaries or edges of that array that provide room for the stencil of a stencil calculation to extend into in retrieving data from adjacent cells without causing unpredictable results in that stencil calculation. Such dummy cells may be populated with data that is selected to avoid causing invalidity, perturbations, or other undesirable effects in stencil calculations, and the presence of those dummy cells eliminates the need for location tests to be incorporated into each performance of stencil calculations.

The accessing component 346 also incorporates an index translation component 3466 that serves to hide the interleaved ordering of data of the tiled 3D array 337 from other components (e.g., the main component 345), thereby allowing those other components to use a conventional triplet of indices in specifying a cell associated with data to which those other components request access. The index translation component 3466 translates such a triplet of indices into an address of the storage location at which the data to which access is requested is stored. Thus, from the perspective of other components, the data stored in the tiled 3D array 337 is caused to appear to have been stored in a typical rowcolumn-plane order that is amenable to being accessed through simple use of a convention triplet of indices specifying the location of a cell by its location on along three axes.

As has been described in reference to FIG. 6, in some embodiments, the compiled routine 340 includes a distinct stencil component 341 to perform a 3D stencil calculation on at least a portion of the data set 330 as stored in the tiled 3D array 337. In such embodiments, the stencil component 341 accesses data of the tiled 3D array 337 through the accessing component 346 using such triplets of indices such that the interleaved ordering of the storage of data in the tiled 3D array 337 is hidden from the stencil component 341.

However and as has been described in reference to FIG. 7, in other embodiments, the compiled routine 340 provides the accessing routine with the stencil calculation definition 132, indicating various parameters of the 3D stencil calculation to provide a description of that 3D stencil calculation to the accessing component 346 to enable the accessing component 346 to actually perform the 3D stencil calculation upon being requested to do so. Such a request may be received by the accessing component 346 from the main component 345, and that request may define what portion of the tiled 3D array 337 about which to convolve the 3D stencil calculation. In such embodiments, the performance of the 3D stencil calculation by the accessing component 346 eliminates the need to engage in translating triplets of indices as part of performing the 3D stencil calculation.

Figure 9:
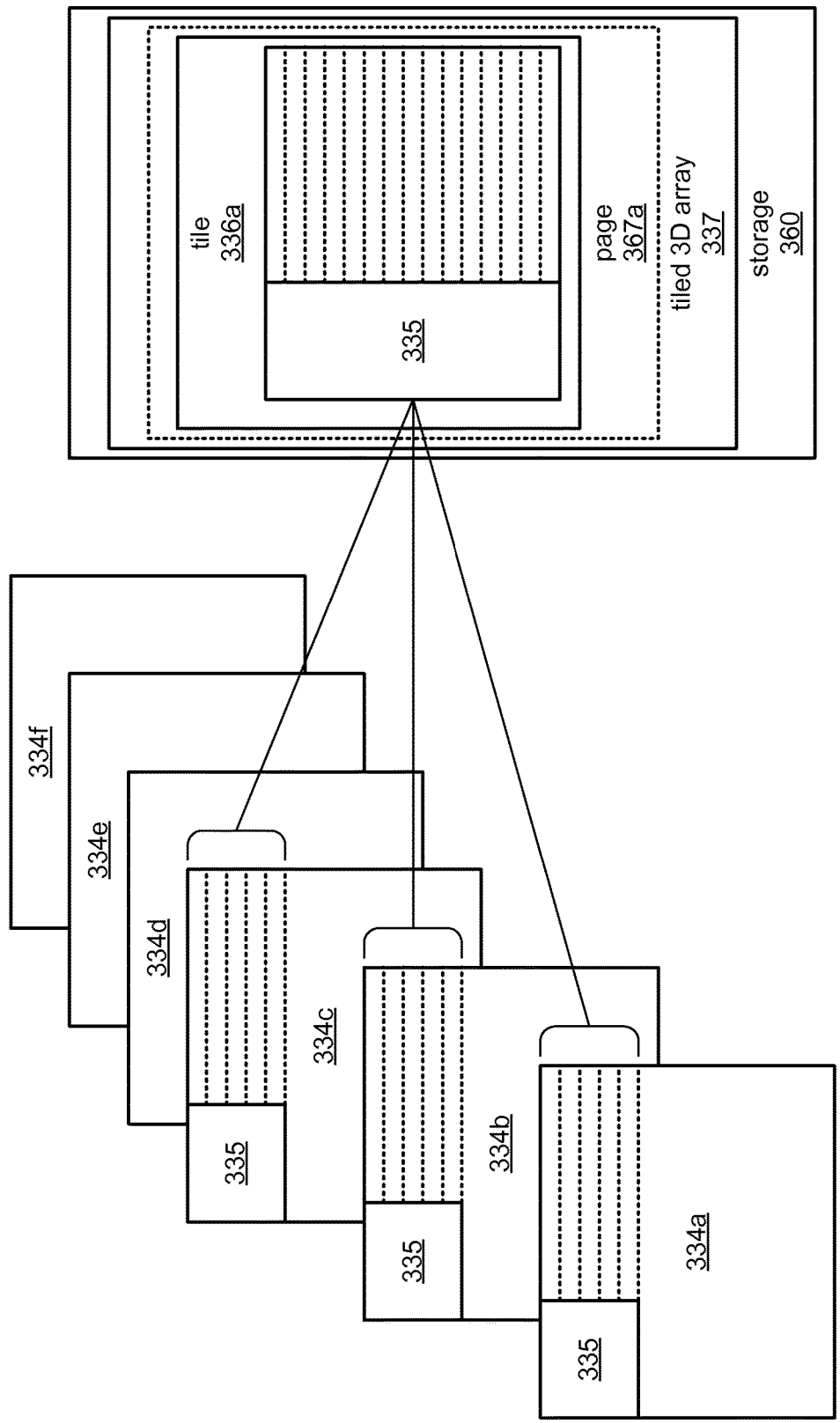
FIG. 9 illustrates aspects of improved accessing of 3D data in an embodiment.

Further, in such embodiments in which the accessing component 346 directly performs the 3D stencil calculation, the accessing component 346 may include a cache blocking component 3465 to perform that calculation in an order in which it is performed on blocks of cells into which the tiles are subdivided, one block at a time. FIG. 9 illustrates the location of a single block 335 defined within the tile 336a first depicted in FIG. 4. It should be noted that in this depicted example of cache blocking the tile 336a is divided into multiple blocks 335, but for sake of visual clarity, only one of these blocks 335 is depicted. Like the tile 336a, the block 335 in this depicted example of cache blocking is defined within the tile 336a to span multiple adjacent rows both across multiple planes and including multiple rows within each plane. Where the number of cells in each row is divisible by the desired number of blocks 335, then each block 335 may be of equal size. Alternatively or additionally, where the tiled 3D array 337 has been formed with some amount of padding (e.g., extra rows, columns and/or planes), one or more of the blocks 335 may extend into such padding to include "dummy" cells of such padding.

The division of the tile 336a into such blocks 335 is part of implementing cache blocking to improve the cache hit rate of the cache 356 of the processor component 350 during performance of a 3D stencil operation. Therefore, in some embodiments, how many blocks the tile 336a is divided into may depend on how many cells within a single row provides sufficient data to fill a cache line of the cache 356, or multiple cache lines of the cache 356, or the entirety of the cache 356. Thus, for example, during performance of a 3D stencil calculation in which the 3D stencil calculation is to be convolved about all the cells of the tile 336a, the 3D stencil calculation would first be convolved about only the cells of the depicted block 335, before being convolved about only the cells of the next block 335 in the tile, and so on one block at a time through all of the blocks 335 of the tile 336a. As performance of the 3D stencil calculation occurs solely within one of the blocks 335, the data of the same portions of each of the rows within that one of the blocks is accessed repeatedly, thereby increasing the likelihood of the data of those portions of those rows remaining in cache lines of the cache 356, and thereby increasing the efficiency with which the calculation is performed by increasing the frequency of cache hits.

It should be noted, however, that despite the depiction in FIG. 9 of the blocks 335 being defined to coincide with the boundaries of a single tile, in other embodiments, blocks of a cache blocking scheme may be defined that are in no way aligned with the boundaries of the tiles of the tiled 3D array 337. This may arise, for example, where the selection of rows to make up each tile to reduce thrashing in the TLB 357 simply does not coincide with the selection rows to make up each block 335 to increase the efficiency of the use of the cache 356.

As has been discussed, whether a 3D stencil calculation is performed by a distinct stencil component 341 or performed by the accessing component 346 based on received parameters, the results may be stored as the results data 530. However, in alternate embodiments, the results may be stored within the tiled 3D array 337, especially where it is intended that a 3D stencil calculation is used to update portions of data of the data set 330 as stored in the tiled 3D array 337.

It should be noted that although the discussion herein has centered on the interleaving of rows of multiple adjacent planes of a single 3D array to define tiling within that single 3D array, the techniques presented herein may also be applied to arrays of more than three dimensions. By way of example, the tiled 3D array 337 may be one of multiple tiled 3D arrays making up a tiled four-dimensional (4D) array (not shown) in which each of the tiled 3D arrays constitutes a point along a fourth dimension (e.g., a time dimension where the three dimensions of each tiled 3D array represents the typical three spatial dimensions). In such an example tiled 4D array, corresponding adjacent rows (e.g., adjacent rows occupying the same positions in each of multiple tiled 3D arrays) may be interleaved.

Figure 10:
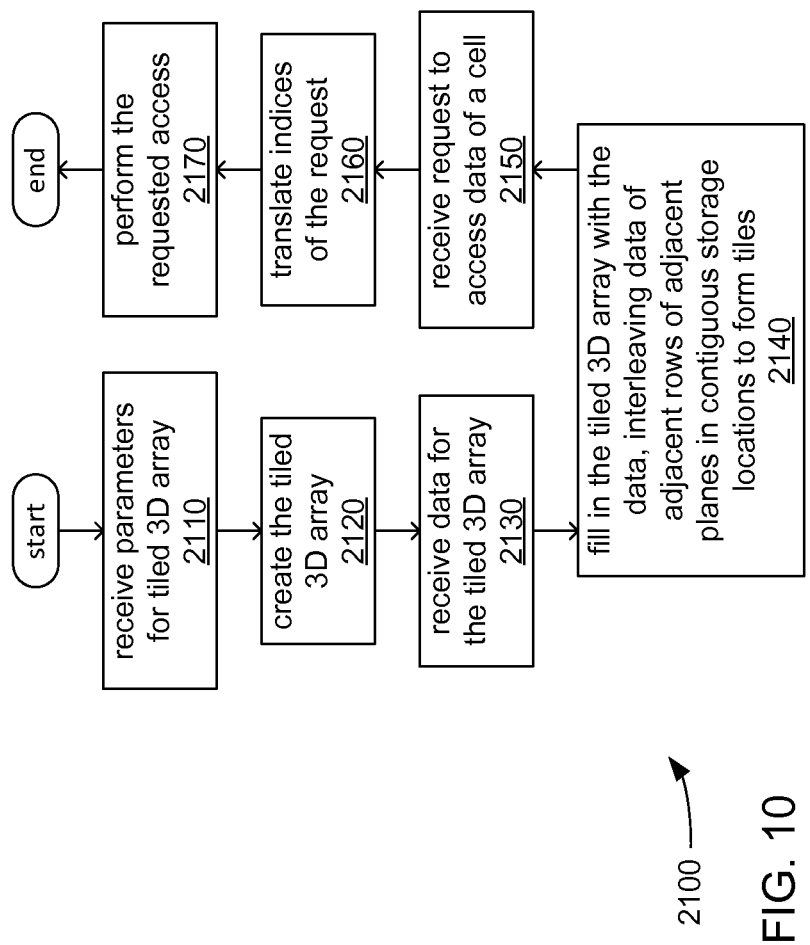
FIGS. 10-11 each illustrate a logic flow according to an embodiment.

FIG. 10 illustrates one embodiment of a logic flow 2100. The logic flow 2100 may be representative of some or all of the operations executed by one or more embodiments described herein. More specifically, the logic flow 2100 may illustrate operations performed by the processor component 350 in executing at least a portion of the compiled routine 340 (e.g., the accessing component 346), and/or performed by other component(s) of the computing device 300.

At 2110, a processor component of a computing device (e.g., either the processor component 350 of the computing device 300) receives parameters for a tiled 3D array (e.g., the tiled 3D array 337). As has been explained, parameters of a tiled 3D array may be indicated in a data structure definition included in source code and the routine compiled therefrom.

At 2120, the tiled 3D array is created, and the data to fill the tiled 3D array is received at 2130. As has been discussed, the data to fill a tiled 3D array may be stored within the same computing device and/or received from another computing device, possibly via a network (e.g., from the computing device 100 via the network 999).

At 2140, the tiled 3D array is filed with the data. In so doing, data of adjacent rows of adjacent planes is stored in contiguous storage locations in an order in which the data of adjacent rows of adjacent planes is interleaved in a storage of the computing device. This is done for a number of adjacent rows in each plane of two or more adjacent planes to form a tile of data representative of a 3D portion of the data. As has been discussed, the total number of rows may be selected to form a tile that fits within, but substantially fills a page of the storage.

At 2150, a request is received from another component to access data of a cell of one of the interleaved rows of the tiled 3D array using a triplet of indices to indicate the cell associated with the data to which access is requested. At 2160, the triplet of indices is translated into the address of the storage location at which the requested data is stored, and the requested access is performed at 2170. As has been discussed, the details of the interleaving of rows within the tiled 3D array may be hidden from other components by an accessing component (e.g., the accessing component 346), presenting an outward appearance of the data of the tiled 3D array being stored in a more typical 3D array having a more typical row-column-plane ordering amenable to the use of such indices to specify a particular cell associated with data to which access is sought. By so hiding the details of such interleaving, other components need not address the complexities of determining the storage location at which particular data of interest was stored as a result of the interleaving.

Figure 11:
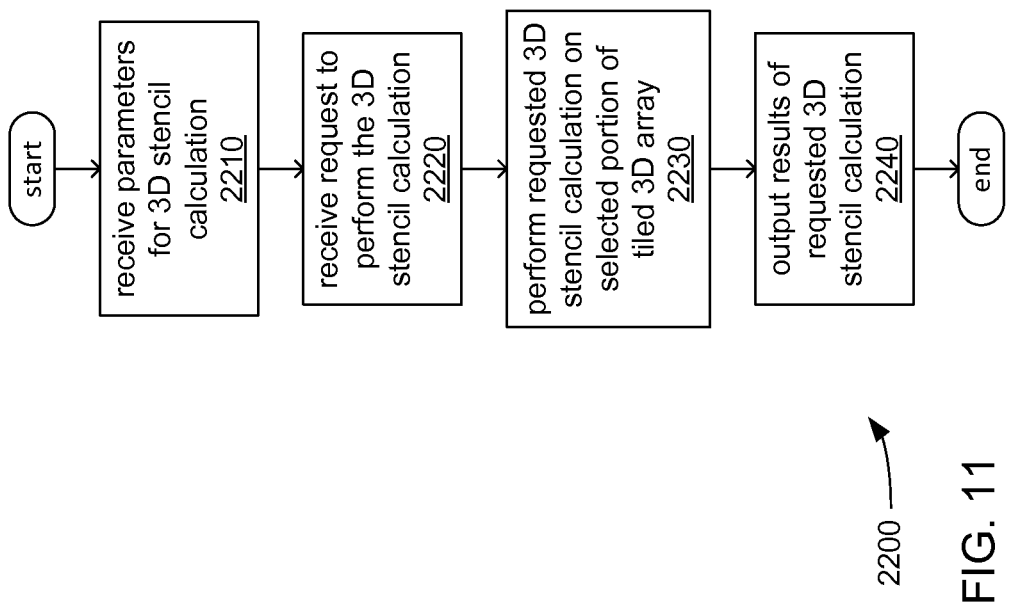

FIG. 11 illustrates one embodiment of a logic flow 2200. The logic flow 2200 may be representative of some or all of the operations executed by one or more embodiments described herein. More specifically, the logic flow 2200 may illustrate operations performed by the processor component 350 in executing at least a portion of the compiled routine 340 (e.g., the accessing component 346), and/or performed by other component(s) of the computing device 300.

At 2210, a processor component of a computing device (e.g., either the processor component 350 of the computing device 300) receives parameters indicative of aspects of a 3D stencil calculation to be performed. As has been explained, aspects of a 3D stencil calculation may be specified in such parameters, including and not limited to, the pattern of the 3D stencil of that calculation (e.g., what neighboring cells in addition to the cell at the focus of the calculation from which data is required).

At 2220, a request is received from another component (e.g., the main component 345) to perform the 3D stencil calculation on cells of a tiled 3D array stored in a storage of the computing device (e.g., the tiled 3D array 337 stored in the storage 360). As has been discussed, the request may include an indication of what is the selected portion of that tiled 3D array about which the 3D stencil calculation is to be convolved (e.g., what cells are to be the focus of each individual performance of that 3D stencil calculation).

At 2230, the requested 3D stencil operation is performed on the selected portion of the tiled 3D array, and the results are output at 2240. As has been discussed, the results of the performance of a 3D stencil calculation that is convolved about a tiled 3D array may be stored as a separate data set, perhaps in the form of a 3D array (e.g., the results data 530).

Figure 12:
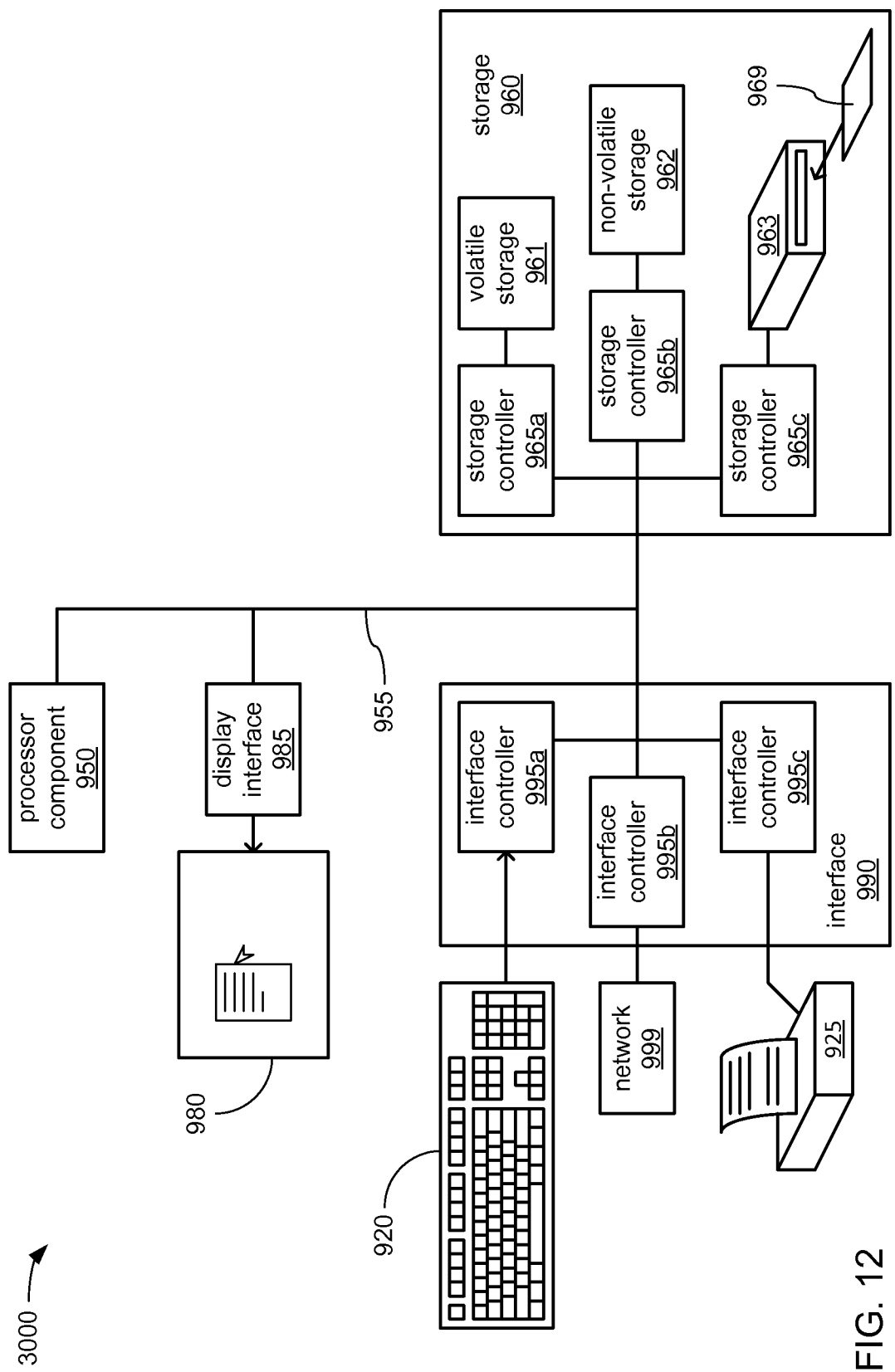
FIG. 12 illustrates a processing architecture according to an embodiment.

FIG. 12 illustrates an embodiment of an exemplary processing architecture 3000 suitable for implementing various embodiments as previously described. More specifically, the processing architecture 3000 (or variants thereof) may be implemented as part of one or more of the computing devices 100, 300, or 500. It should be noted that components of the processing architecture 3000 are given reference numbers in which the last two digits correspond to the last two digits of reference numbers of at least some of the components earlier depicted and described as part of the computing devices 100, 300 and 500. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display interface 985.

The coupling 955 includes one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 150, 350 and 550) may include any of a wide variety of commercially available processors, employing any of a wide variety of technologies and implemented with one or more cores physically combined in any of a number of ways.

As previously discussed, the storage 960 (corresponding to the storages 160, 360 and 560) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interfaces 190, 390 or 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to the display 380 or 580), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus to perform a stencil calculation includes a processor component, a storage communicatively coupled to the processor component, and an interleaving component for execution by the processor component to interleave storage of data of cells of adjacent rows of a first plane with data of cells of adjacent rows of an adjacent second plane of a three-dimensional (3D) array among contiguous storage locations of the storage.

The above example of an apparatus in which the interleaving component is to receive parameters that indicate a number of the adjacent rows in the first and second planes and a number of adjacent planes selected to form a tile of data of the 3D array.

Either of the above examples of an apparatus in which the interleaving component is to form multiple tiles of the data of the 3D array in the storage, each tile comprising the number of adjacent rows and the number of adjacent planes indicated in the parameters.

Any of the above examples of an apparatus in which the storage is divided into multiple pages, and the number of adjacent rows and the number of adjacent planes indicated in the parameters selected to cause the tile to span more than one page of the multiple pages.

Any of the above examples of an apparatus in which the storage is divided into multiple pages, and the number of adjacent rows and the number of adjacent planes indicated in the parameters selected to cause the tile to fit within and substantially fill a page of the multiple pages.

Any of the above examples of an apparatus in which the apparatus includes a cache blocking component for execution by the processor component and communicatively coupled to the interleaving component to divide the 3D array into multiple blocks, and a stencil component for execution by the processor component and communicatively coupled to the interleaving component to convolve performance of a 3D stencil calculation about data of the 3D array in an order that progresses one block of the multiple blocks at a time.

Any of the above examples of an apparatus in which the apparatus includes a cache communicatively coupled to the processor component, the number of cells in each portion of a row included in each block selected to enable data of the number cells to fit within the cache.

Any of the above examples of an apparatus in which the interleaving component is to interleave one of single adjacent rows of the first plane with single adjacent rows of the second plane, pairs of adjacent rows of the first plane with pairs of adjacent rows of the second plane, triplets of adjacent rows of the first plane with adjacent rows of the second plane, and quartets of adjacent rows of the first plane with adjacent rows of the second plane.

Any of the above examples of an apparatus in which the apparatus includes an index translation component for execution by the processor component and communicatively coupled to the interleaving component to receive a request to access data associated with a cell of a row of the adjacent rows of the first plane that specifies the cell with a triplet of indices, and translate the triplet of indices into an address of a storage location of contiguous storage locations in which the data is stored.

Any of the above examples of an apparatus in which the apparatus includes a communications component for execution by the processor component to receive the 3D array from a computing device via a network.

Any of the above examples of an apparatus in which the 3D array occupies a point along a fourth dimension of an array of more than three dimensions, and the interleaving component to interleave storage of data cells of adjacent rows of the first and second planes of the 3D array with cells of corresponding adjacent rows of other first and second adjacent planes of another 3D array occupying another point along the fourth dimension.

An example of another apparatus to perform a stencil calculation includes a processor component, a storage communicatively coupled to the processor component, and a stencil component for execution by the processor component to convolve a performance of a three-dimensional (3D) stencil calculation about a tiled 3D array comprising data of cells of adjacent rows of a first plane interleaved with data of cells of adjacent rows of a second plane among storage locations of the storage.

The above example of another apparatus in which the stencil component is to receive parameters indicating a shape of a 3D stencil of the 3D stencil calculation.

Either of the above examples of another apparatus in which the apparatus includes an interleaving component for execution by the processor component to interleave the data of the cells of the adjacent rows of the first plane with the data of the cells of the adjacent rows of the second plane among the storage locations of the storage to form a tile of multiple tiles of the tiled 3D array in the storage.

Any of the above examples of another apparatus in which the storage is divided into multiple pages, the tile comprising data of cells of a number of adjacent rows of the first plane and a number of adjacent rows of the second plane selected to cause the tile to fit within and substantially fill a page of the multiple pages.

Any of the above examples of another apparatus in which the apparatus includes a cache blocking component for execution by the processor component and communicatively coupled to the interleaving component to divide the tile into multiple blocks of equal size, each block of the multiple blocks comprising data from a portion of every row within the tile, the stencil component communicatively coupled to the interleaving component to convolve performance of a 3D stencil calculation about data of the tile in an order that progresses one block of the multiple blocks at a time.

Any of the above examples of another apparatus in which the apparatus includes a cache communicatively coupled to the processor component and comprising at least one cache line, and the number of cells in each portion of a row included in each block selected to enable data of the number cells to fit within the at least one cache line.

Any of the above examples of another apparatus in which the apparatus includes an index translation component for execution by the processor component and communicatively coupled to the interleaving component to receive a request to access data associated with a cell of a row of the adjacent rows of the first plane that specifies the cell with a triplet of indices, and translate the triplet of indices into an address of a storage location of contiguous storage locations in which the data is stored.

Any of the above examples of another apparatus in which the apparatus includes an interface communicatively coupled to the processor component to receive the 3D array from a computing device via a network.

Any of the above examples of another apparatus in which the apparatus includes an interface communicatively coupled to the processor component to transmit another 3D array of results data from performance of the 3D stencil calculation to a computing device via a network.

An example of a computer-implemented method for performing a stencil calculation includes interleaving storage of data of cells of adjacent rows of a first plane with data of cells of adjacent rows of an adjacent second plane of a three-dimensional (3D) array among contiguous storage locations of a storage to form a tile of data in the storage, and convolving performance of a 3D stencil calculation about data of the tile.

The above example of a computer-implemented method in which the method includes receiving parameters that indicate a number of the adjacent rows in the first and second planes and a number of adjacent planes selected to form the tile.

Either of the above examples of a computer-implemented method in which the method includes forming multiple tiles of the data of the 3D array in the storage, each tile comprising the number of adjacent rows and the number of adjacent planes indicated in the parameters.

Any of the above examples of a computer-implemented method in which the storage is divided into multiple pages, and the number of adjacent rows and the number of adjacent planes indicated in the parameters selected to cause the tile to span more than one page of the multiple pages.

Any of the above examples of a computer-implemented method in which the storage is divided into multiple pages, and the number of adjacent rows and the number of adjacent planes indicated in the parameters selected to cause the tile to fit within and substantially fill a page of the multiple pages.

Any of the above examples of a computer-implemented method in which the method includes dividing the tile into multiple blocks of equal size, each block of the multiple blocks comprising data from a portion of every row within the tile, and convolving performance of the 3D stencil calculation about data of the tile in an order that corresponds with progressing one block of the multiple blocks at a time.

Any of the above examples of a computer-implemented method in which the number of cells in each portion of a row included in each block selected to enable data of the number cells to fit within a cache of a processor component.

Any of the above examples of a computer-implemented method in which the method includes interleaving one of single adjacent rows of the first plane with single adjacent rows of the second plane, pairs of adjacent rows of the first plane with pairs of adjacent rows of the second plane, triplets of adjacent rows of the first plane with adjacent rows of the second plane, and quartets of adjacent rows of the first plane with adjacent rows of the second plane.

Any of the above examples of a computer-implemented method in which the method includes receiving a request to access data associated with a cell of a row of the adjacent rows of the first plane that specifies the cell with a triplet of indices, and translating the triplet of indices into an address of a storage location of contiguous storage locations in which the data is stored.

Any of the above examples of a computer-implemented method in which the method includes one of receiving the 3D array from a computing device via a network and transmitting another 3D array of results data from performance of the 3D stencil calculation to the computing device via the network.

An example of an apparatus for performing a stencil calculation includes means for performing any of the above examples of a computer-implemented method.

An example of at least one machine readable storage medium includes instructions that when executed by a computing device, causes the computing device to perform any of the above examples of a computer-implemented method.

An example of at least one machine-readable storage medium includes instructions that when executed by a computing device, cause the computing device to interleave storage of data of cells of adjacent rows of a first plane with data of cells of adjacent rows of an adjacent second plane of a three-dimensional (3D) array among contiguous storage locations of a storage of the computing device to form a tile of data in the storage.

The above example of at least one machine-readable storage medium in which the computing device is caused to receive parameters that indicate a number of the adjacent rows in the first and second planes and a number of adjacent planes selected to form the tile.

Either of the above examples of at least one machine-readable storage medium in which the computing device is caused to form multiple tiles of the data of the 3D array in the storage, each tile comprising the number of adjacent rows and the number of adjacent planes indicated in the parameters.

Any of the above examples of at least one machine-readable storage medium in which the storage is divided into multiple pages, and the number of adjacent rows and the number of adjacent planes indicated in the parameters selected to cause the tile to fit within and substantially fill a page of the multiple pages.

Any of the above examples of at least one machine-readable storage medium in which the computing device is caused to divide the tile into multiple blocks of equal size, each block of the multiple blocks comprising data from a portion of every row within the tile, and convolve performance of a 3D stencil calculation about data of the tile in an order that corresponds with progressing one block of the multiple blocks at a time.

Any of the above examples of at least one machine-readable storage medium in which the number of cells in each portion of a row included in each block selected to enable data of the number cells to fit within a cache line of a processor component.

Any of the above examples of at least one machine-readable storage medium in which the computing device is caused to interleave one of single adjacent rows of the first plane with single adjacent rows of the second plane, pairs of adjacent rows of the first plane with pairs of adjacent rows of the second plane, triplets of adjacent rows of the first plane with adjacent rows of the second plane, and quartets of adjacent rows of the first plane with adjacent rows of the second plane.

Any of the above examples of at least one machine-readable storage medium in which the computing device is caused to receive a request to access data associated with a cell of a row of the adjacent rows of the first plane that specifies the cell with a triplet of indices, and translate the triplet of indices into an address of a storage location of contiguous storage locations in which the data is stored.

Any of the above examples of at least one machine-readable storage medium in which the computing device is caused to receive the 3D array from another computing device via a network.

The invention claimed is:

1. An apparatus comprising:
   a processor component of a computing device;
   a storage of the computing device, the storage communicatively coupled to the processor component; and
   an interleaving component of the computing device for execution by the processor component to interleave storage of data of cells of adjacent rows of a first plane with data of cells of adjacent rows of an adjacent second plane of a three-dimensional (3D) array among contiguous storage locations of the storage, the interleaving component to generate an alternating order of adjacent rows from the first plane and the second plane of the 3D array in an interleaving pattern by interleaving on a row-by-row basis causing at least one row of the first plane to be followed by a same row of the adjacent second plane in contiguous storage locations of the storage.

2. The apparatus of claim 1, the interleaving component to receive parameters that indicate a number of the adjacent rows in the first and second planes and a number of adjacent planes selected to form a tile of data of the 3D array.

3. The apparatus of claim 2, the interleaving component to form multiple tiles of the data of the 3D array in the storage, each tile comprising the number of the adjacent rows and the number of adjacent planes indicated in the parameters.

4. The apparatus of claim 2, the storage divided into multiple pages, and the number of the adjacent rows and the number of adjacent planes indicated in the parameters selected to cause the tile to fit within and substantially fill a page of the multiple pages.

5. The apparatus of claim 2, comprising:
   a cache blocking component for execution by the processor component and communicatively coupled to the interleaving component to divide the 3D array into multiple blocks; and
   a stencil component for execution by the processor component and communicatively coupled to the interleaving component to convolve performance of a 3D stencil calculation about data of the 3D array in an order that progresses one block of the multiple blocks at a time.

6. The apparatus of claim 5, comprising a cache communicatively coupled to the processor component, a number of cells in each portion of a row included in each block selected to enable data of the number of cells to fit within the cache.

7. The apparatus of claim 1, comprising an index translation component for execution by the processor component and communicatively coupled to the interleaving component to receive a request to access data associated with a cell of a row of the adjacent rows of the first plane that specifies the cell with a triplet of indices, and translate the triplet of indices into an address of a storage location of the contiguous storage locations in which the data is stored.

8. The apparatus of claim 1, comprising a communications component for execution by the processor component to receive the 3D array from a computing device via a network.

9. The apparatus of claim 1, the 3D array occupying a point along a fourth dimension of an array of more than three dimensions, and the interleaving component to interleave storage of data cells of adjacent rows of the first and second planes of the 3D array with cells of corresponding adjacent rows of other first and second adjacent planes of another 3D array occupying another point along the fourth dimension.

10. An apparatus comprising:
a processor component of a computing device;
a storage of the computing device, the storage communicatively coupled to the processor component; and
a stencil component of the computing device for execution by the processor component to convolve a performance of a three-dimensional (3D) stencil calculation about a tiled 3D array comprising data of cells of adjacent rows of a first plane interleaved with data of cells of adjacent rows of a second plane among contiguous storage locations of the storage, the data interleaved to generate an alternating order of adjacent rows from the first plane and the second plane of the 3D array by interleaving on a row-by-row basis causing at least one row of the first plane to be followed by a same row of the adjacent second plane in contiguous storage locations of the storage.

11. The apparatus of claim 10, the stencil component to receive parameters indicating a shape of a 3D stencil of the 3D stencil calculation.

12. The apparatus of claim 10, comprising an interleaving component for execution by the processor component to interleave the data of the cells of the adjacent rows of the first plane with the data of the cells of the adjacent rows of the second plane among the storage locations of the storage to form a tile of multiple tiles of the tiled 3D array in the storage.

13. The apparatus of claim 12, comprising an index translation component for execution by the processor component and communicatively coupled to the interleaving component to receive a request to access data associated with a cell of a row of the adjacent rows of the first plane that specifies the cell with a triplet of indices, and translate the triplet of indices into an address of a storage location of the contiguous storage locations in which the data is stored.

14. The apparatus of claim 10, comprising an interface communicatively coupled to the processor component to transmit another 3D array of results data from performance of the 3D stencil calculation to a computing device via a network.

15. A computer-implemented method comprising:
interleaving storage of data of cells of adjacent rows of a first plane with data of cells of adjacent rows of an adjacent second plane of a three-dimensional (3D) array among contiguous storage locations of a storage to form a tile of data in the storage, the data interleaved to generate an alternating order of adjacent rows from the first plane and the second plane of the 3D array in an interleaving pattern by interleaving on a row-by-row basis causing at least one row of the first plane to be followed by a same row of the adjacent second plane in contiguous storage locations of the storage; and
convolving performance of a 3D stencil calculation about data of the tile.

16. The computer-implemented method claim 15, comprising receiving parameters that indicate a number of the adjacent rows in the first and second planes and a number of adjacent planes selected to form the tile.

17. The computer-implemented method of claim 16, the storage divided into multiple pages, and the number of adjacent rows and the number of adjacent planes indicated in the parameters selected to cause the tile to span more than one page of the multiple pages.

18. The computer-implemented method of claim 15, comprising one of receiving the 3D array from a computing device via a network and transmitting another 3D array of results data from performance of the 3D stencil calculation to the computing device via the network.

19. At least one non-transitory machine-readable storage medium comprising instructions that when executed by a computing device, cause the computing device to:
interleave storage of data of cells of adjacent rows of a first plane with data of cells of adjacent rows of an adjacent second plane of a three-dimensional (3D) array among contiguous storage locations of a storage of the computing device to form a tile of data in the storage, the data interleaved to generate an alternating order of adjacent rows from the first plane and the second plane of the 3D array by interleaving on a row-by-row basis causing at least one row of the first plane to be followed by a same row of the adjacent second plane in contiguous storage locations of the storage.

20. The at least one machine-readable storage medium of claim 19, the computing device caused to receive parameters that indicate a number of the adjacent rows in the first and second planes and a number of adjacent planes selected to form the tile.

21. The at least one machine-readable storage medium of claim 20, the computing device caused to form multiple tiles of the data of the 3D array in the storage, each tile comprising the number of the adjacent rows and the number of adjacent planes indicated in the parameters.

22. The at least one machine-readable storage medium of claim 20, the storage divided into multiple pages, and the number of the adjacent rows and the number of adjacent planes indicated in the parameters selected to cause the tile to fit within and substantially fill a page of the multiple pages.

23. The at least one machine-readable storage medium of claim 20, the computing device caused to:
divide the tile into multiple blocks of equal size, each block of the multiple blocks comprising data from a portion of every row within the tile; and
convolve performance of a 3D stencil calculation about data of the tile in an order that corresponds with progressing one block of the multiple blocks at a time.

24. The at least one machine-readable storage medium of claim 19, the computing device caused to:
receive a request to access data associated with a cell of a row of the adjacent rows of the first plane that specifies the cell with a triplet of indices; and
translate the triplet of indices into an address of a storage location of the contiguous storage locations in which the data is stored.

25. The at least one machine-readable storage medium of claim 19, the computing device caused to receive the 3D array from another computing device via a network.

* * * * *